(12) United States Patent
Schoning et al.

(10) Patent No.: US 8,346,511 B2
(45) Date of Patent: Jan. 1, 2013

(54) ANALYSIS SYSTEM AND METHOD FOR ANALYZING CONTINUOUS QUERIES FOR DATA STREAMS

(75) Inventors: Harald Schoning, Dieburg (DE); Udo Hafermann, Darmstadt (DE); Ulrich Post, Seeheim-Jugenheim (DE)

(73) Assignee: Software AG, Darmstadt (DE)

( * ) Notice: Subject to any disclaimer, the term of this patent is extended or adjusted under 35 U.S.C. 154(b) by 412 days.

(21) Appl. No.: 12/656,465

(22) Filed: Jan. 29, 2010

(65) Prior Publication Data
US 2011/0178775 A1    Jul. 21, 2011

(30) Foreign Application Priority Data
Jan. 21, 2010   (EP) .................................... 10151315

(51) Int. Cl.
*G06F 15/00* (2006.01)

(52) U.S. Cl. ...................................................... 702/190

(58) Field of Classification Search .................. 702/190
See application file for complete search history.

(56) References Cited

U.S. PATENT DOCUMENTS

| | | | |
|---|---|---|---|
| 2007/0121674 A1* | 5/2007 | Chen et al. | 370/468 |
| 2009/0106214 A1* | 4/2009 | Jain et al. | 707/4 |
| 2009/0228434 A1 | 9/2009 | Krishnamurthy et al. | |
| 2009/0327257 A1 | 12/2009 | Abouzeid et al. | |

OTHER PUBLICATIONS

"Introducing Microsoft StreamInsight", Grabs et al., Microsoft SQL Server 2008, Published Sep. 2009.

* cited by examiner

*Primary Examiner* — Cindy H Khuu
(74) *Attorney, Agent, or Firm* — Nixon & Vanderhye PC (57) ABSTRACT

Certain example embodiments concern an analysis system for analyzing at least one continuous query for at least one input data stream. The at least one input data stream includes a sequence of events captured by at least one sensor. The debugging system includes an analyzer for executing the at least one continuous query and at least one modified continuous query on the at least one input data stream, for comparing at least one output data stream produced by the at least one continuous query with at least one second output data stream produced by the at least one modified continuous query, and for indicating at least one difference between the at least one output data stream and the at least one second output data stream. The analyzer synchronizes the execution of the at least one continuous query and the at least one modified continuous query.

13 Claims, 5 Drawing Sheets

ANALYSIS SYSTEM AND METHOD FOR ANALYZING CONTINUOUS QUERIES FOR DATA STREAMS

This application claims priority to European Application No. 10151315.8, filed 21 Jan. 2010, the entire contents of which is hereby incorporated by reference.

1. TECHNICAL FIELD

The present invention relates to an analysis system and a method for analyzing continuous queries for data streams.

2. THE PRIOR ART

Modern computer systems oftentimes operate on streaming data, i.e. on a consecutive sequence of data items (also called events) captured by a sensor, wherein the already received data items are processed while further data items are still captured by the sensor. Typical application scenarios are security systems, such as facility surveillance systems, where streams of data items captured by a card reader are processed in order to identify unauthorized access to confidential areas within the facility or other abnormal behavior of the people entering and leaving a building. A data item within a data stream is typically characterized by certain attributes and may have a simple or complex structure. Examples of event attributes are a person's ID, name and gender when the person pulls its ID card through the card reader, a timestamp of the event or the current working day.

In order to process such, conceptually infinite, streams of data items/events, it is known to process queries on such input data streams that divide the stream of events into finite processable portions, known as windows, and to apply computations on the windows in order to generate further, possibly infinite, output event streams resulting from the concatenation of the computation results. A window specification typically comprises a start condition and an end condition, so that windows (i.e. concrete sub-sequences of events in a given stream) each comprise all consecutive events between a start event matching the start condition and an end event matching the end condition. Because the same query is typically applied to a continuous stream of events, the term "continuous query" is often used in the prior art.

While the detection of abnormal behavior relating to one single data item/event is rather straight-forward (e.g. determining that a person's ID card has expired when the card is read by the card reader), most real-life scenarios require the detection and processing of more complex situations that relate to multiple data items within the stream (e.g. that a person entered a certain room, but did not leave the room after a predetermined amount of time). This processing paradigm is generally known as complex event processing (CEP).

In such a complex event processing scenario, it is desired to provide means for analyzing/debugging a given continuous query, i.e. to assess whether the query behaves as expected. Otherwise, the query might produce false alarms or, more importantly, miss certain important events that indicate abnormal behavior. In this context, questions such as the following are of importance: Why was a certain output event generated? Why did a certain expected output event not occur? How would the output event stream change given a certain modification of the query? How stable is the result (i.e. how sensitive is the query result, i.e. the output stream, to the position in the input event stream where the evaluation was started)?

In the prior art, products are known that provide basic debugging functionalities for continuous queries on infinite data streams. The provided functionality is typically inspired by traditional program debugging. In traditional debugging approaches for computer programs, it is known to define breakpoints on certain instructions within the program code, so that the program execution stops when the breakpoint is reached. Then, the code and the current values of its variables can be inspected in order to assess if the code behaves as expected. However, debugging/analyzing continuous queries is shifting the dimensions, since the execution of a given continuous query does not stop at a certain program instruction code, as in traditional program debugging. On the contrary, in continuous query processing, the query execution stops at certain data (i.e. somewhere inside the infinite input stream of events). Accordingly, in continuous query processing, breakpoints have to operate on data flow instead of on instruction flow. In typical prior art products for complex event processing, a breakpoint may therefore be set between two operators in the operator graph of the continuous query that will cause the query to stop if data flows over this path. In some products, these breakpoints may carry conditions that have to be met before the execution stops. On such a breakpoint, the stream may be inspected (i.e. all events that are waiting to be processed and possibly also events that have already been processed).

One of the systems known from the prior art is Aleri, which provides means for recording and playing back a continuous data stream. More particularly, recorded data streams may be played back at variable rates, e.g. in accelerated, decelerated, or fixed rate playback. Streams may be uploaded from files and events may be manually injected into the system. A further system known from the prior art is the StreamBase Visual Debugger, which allows one to track the complete history (e.g. intermediate states in the operators) of each event through a continuous query. Switching the system to debug mode is the prerequisite for using such functionality. StreamBase also provides means to run simulated event streams.

As a result, the known systems allow for deriving conclusions about why a certain output event was generated given a particular input data stream and a continuous query (by setting a breakpoint and inspecting the history of the output event once the breakpoint is reached during debugging).

However, the question how the output event stream would change for a certain query modification cannot be answered by the prior art approaches. In the prior art, the changed output stream (resulting from the execution of the modified query) could be produced by running a recorded stream (also referred to as a probe stream) through the modified query, however, there is no correlation of this changed output stream with the output stream resulting from the original query, so that no conclusions can be drawn as to the impact of the modified query. In particular, a probe stream by definition has to be finite, since a recorded stream has to be stored in some sort of storage medium with finite storage space. As a result, only a very limited sub-set of a given, conceptually infinite, event stream can be considered. Also the question why a certain expected output event did not occur given a certain query cannot be answered by the prior art approaches, since it is only possible to set a breakpoint that triggers when a certain event occurs, but not on an event that does not occur. Lastly, also the question how sensitive the query result is on the starting point of the evaluation cannot be answered by the prior art approaches.

It is therefore the technical problem underlying the present invention to provide an improved approach to analyzing continuous queries over data streams that at least partly overcomes the above explained disadvantages of the prior art.

3. SUMMARY OF THE INVENTION

This problem is according to one aspect of the invention solved by an analysis system for analyzing at least one continuous query for at least one input data stream, wherein the at least one input data stream comprises a sequence of events captured by at least one sensor. In the embodiment of claim 1, the analysis system comprises:

a. an analyzer, adapted for executing the at least one continuous query and at least one modified continuous query on the at least one input data stream, for comparing at least one output data stream produced by the at least one continuous query with at least one second output data stream produced by the at least one modified continuous query and for indicating at least one difference between the at least one output data stream and the at least one second output data stream;

b. wherein the analyzer is adapted for synchronizing the execution of the at least one continuous query and the at least one modified continuous query.

Accordingly, the embodiment defines an analysis system preferably used in the context of complex event processing (CEP) comprising an analyzer that allows for the execution of pairs of queries on a given input data stream, namely at least one continuous query (the "original query" under investigation) and at least one modified continuous query. Preferably, the at least one continuous query and the at least one modified continuous query are executed in parallel by the analyzer, however, the queries may alternatively be executed sequentially or in an interlocked manner. By comparing and indicating differences in the respective output data streams produced by these queries, conclusions can be drawn about how the output event stream changes given a certain query modification. To this end, an implicit breakpoint is preferably set that fires when a difference between the two output data streams is encountered, wherein a difference may be two differing events at the same position within the at least one output data stream and the at least one second output data stream, respectively.

However, applicant has found that the computation of such differences is extremely difficult, because the processing speed of the two given queries (the original and the modified query) might be different, i.e. depending on the structure of the queries, events in the corresponding output data streams may be produced at different rates, while the queries process the input data stream captured by the sensor. It should be noted that the query processing is typically executed while the sensor still captures events, i.e. the queries operate on "live" data. In addition, the at least one modified continuous query might need to run some time before it even produces output events (e.g. if events are aggregated over a day; see the example further below). Therefore, the present invention according to the above embodiment synchronizes the execution of the at least one continuous query and the at least one modified continuous query. By synchronizing the execution of the pairs of queries under investigation, it is guaranteed that the queries are executed in such an interlocked manner that their respective output data streams can be compared, which would not be possible without synchronization. In other words, the rate at which the output events within the respective output data streams are produced is aligned between the at least one continuous query to and the at least one modified continuous query, so that the output events within the respective output data streams can be compared, preferably one-by-one.

In one aspect of the present invention, the analyzer may be adapted for waiting for the at least one modified continuous query to produce at least one event in the corresponding at least one second output data stream and for comparing the at least one produced event with at least one corresponding event in the at least one output data stream produced by the at least one continuous query. This synchronization approach is particularly advantageous if the queries have a shape that allows to conclude that they will eventually produce comparable results (output data streams) regardless of the event in the input data stream they start with. In other words, the continuous queries are in this case agnostic to the starting point within the input data stream. Preferably, the analyzer waits for the at least one modified query to produce output events, and then (virtually) stops the input data streams for both queries, i.e. the at least one continuous query and the at least one modified continuous query (i.e. the system state is recorded as if the query execution had been stopped). The last event these queries generate is the synchronization point. For each event produced by the at least one modified continuous query, a corresponding output event of the at least one continuous query may now be identified. If the events are not equal, the analyzer may stop and indicate this difference, e.g. on a command line or a graphical user interface.

However, some types of continuous queries (e.g. queries with windows using tumbling windows with fixed size and arbitrary starting point) are sensitive to the position in the input data stream where they start processing. For example, an exemplary continuous query that groups input events into windows of size 5, starting with the first event it encounters within the at least one input data stream, will produce different results if started with event x than if started with the subsequent event x+1. In this case, synchronizing the execution of the at least one continuous query and the at least one modified continuous query is more complex.

In one aspect, the analyzer may therefore be adapted for letting a user select at least one synchronization point within the at least one input data stream, i.e. the user may determine at which event within the input data stream the execution of the original query and the modified query is supposed to start. In another aspect, the analyzer may be adapted for analyzing the at least one continuous query to determine at least one synchronization point within the at least one input data stream. In other words, the present invention automatically determines a suitable starting point for the at least one modified continuous query. In yet another aspect, the analyzer may be adapted for executing the at least one modified continuous query and a copy of the at least one continuous query, starting at the same event in the at least one input data stream. This aspect also allows to derive conclusions about the result stability, e.g. by comparing the results of the original query and its copy, as will be further explained in the detailed description below.

Additionally or alternatively, the analysis system may further comprise a stream logger, adapted for recording the at least one input data stream into at least one recorded input data stream, wherein the analyzer may be adapted for executing the at least one modified continuous query on the at least one recorded input data stream followed by the at least one input data stream while it is captured by the at least one sensor. Accordingly, the at least one recorded input data stream may be used as initial feed to the at least one modified continuous query, preferably seamlessly followed by the "live stream" captured by the sensor. As a result, earlier result generation is possible and a synchronization point may be set to the current time in case the queries are agnostic to the starting point within the input data stream (which is the time when the recorded event streams end). Alternatively, a synchronization point in the past may be selected in case the queries are sensitive to the starting point.

In another aspect of the present invention, the analysis system may further comprise a graphical user interface (GUI), adapted for displaying at least one operator graph of the at least one continuous query and at least one operator graph of the at least one modified continuous query, wherein the GUI is adapted for highlighting the at least one difference in the at least one operator graphs. As for known database queries e.g. in relational databases, also a continuous query may be decomposed into a set of query operators. Thus, a given query may be conceptually considered as an operator graph that comprises the individual query operators and the data flow (i.e. one or more intermediate streams) connecting the query operators. Accordingly, the query operator graph may graphically indicate differences for each corresponding operator node (in case the operator graphs are similar enough).

In yet another aspect, the analysis system may further comprise a stream logger, adapted for recording the at least one output data stream into at least one recorded output data stream, wherein the analyzer may be adapted for selecting at least one event in the at least one recorded output data stream and for providing access to the corresponding at least one event in at least one recorded input data stream. Accordingly, the analyzer may provide the functionality to go back in history within the produced output data stream to a certain time under consideration, i.e. to a certain produced output event and correlate this output event with the respective event(s) within the input data stream (also referred to as "wind back" functionality hereinafter). It will be appreciated that this aspect of the present invention can be advantageously employed independently from the above presented embodiments, in particular in an analysis system that allows for executing at least one continuous query on at least one input data stream. The "wind back" functionality serves to answer the question why a certain expected event did not occur within the produced output data stream(s), as will be further explained in the detailed description below. In one aspect, the analyzer may be adapted for automatically highlighting one or more query operators within an operator graph of the respective query that would have delivered the relevant selected at least one event (cf. the detailed description below).

Furthermore, the analyzer may be adapted for re-executing the at least one continuous query on the at least one recorded input data stream starting at the at least one selected event and for logging any intermediate results produced by the at least one continuous query. Accordingly, this allows for inspecting not only the current operator graph at the point in time under consideration, but also any intermediate data streams produced by the query operators of the operator graph (a functionality referred to as "trace back" hereinafter).

The present invention also concerns a method for analyzing at least one continuous query for at least one input data stream, wherein the at least one input data stream comprises a sequence of events captured by at least one sensor and wherein the method comprises the following steps:

a. executing the at least one continuous query and at least one modified continuous query on the at least one input data stream, comparing at least one output data stream produced by the at least one continuous query with at least one second output data stream produced by the at least one modified continuous query and indicating at least one difference between the at least one output data stream and the at least one second output data stream; and b. synchronizing the execution of the at least one continuous query and the at least one modified continuous query.

Further advantageous modifications of embodiments of the method of the invention are defined in further dependent claims.

The present invention also provides a computer program comprising instructions for implementing any of the above presented methods.

In a further embodiment, the present invention provides an analysis system and a corresponding method for the evaluation of one or more results (consequences) of executing a modified continuous query on one or more continuous (and conceptually infinite) input event stream(s) during complex event processing (CEP), wherein the analysis system comprises: means for determining a synchronization point within the one or more results (output stream(s)) produced by the execution of the modified continuous query and an original continuous query; means for comparing the one or more results (output stream(s)) of the execution of the modified continuous query and the original continuous query; and means for triggering one or more implicit breakpoints (event(s)) when a difference between results (output streams) is detected.

In yet another embodiment, the present invention provides an analysis system and a corresponding method for analyzing interactions resulting from execution of one or more continuous queries on a continuous (and conceptually infinite) input event stream during complex event processing (CEP) that resulted in one or more events failing to occur as expected (predicted), wherein the analysis system comprises: means for configuring the analysis system to provide a specific amount of historical data; means (based on an analysis of the one or more queries) for a synchronized winding back of the input stream and results (output stream) to a specific point within the historical data; means for determining the expected occurrence; means for replaying the one or more queries, for memorizing intermediate results to the point after the expected occurrence; and means for comparing and/or evaluating the intermediate results.

4. SHORT DESCRIPTION OF THE DRAWINGS

In the following detailed description, presently preferred embodiments of the invention are further described with reference to the following figures.

5. DETAILED DESCRIPTION

As already presented above, various embodiments of the analysis system and associated method described herein allow for deriving conclusions about how the output data stream would change for a certain query modification (hereinafter Question I), why a certain expected output event did not occur within the output data stream (hereinafter Question II) and/or how sensitive the result is on the starting point of the evaluation (hereinafter Question III) within the context of complex event processing by means of continuous queries over data streams.

Figure 2:
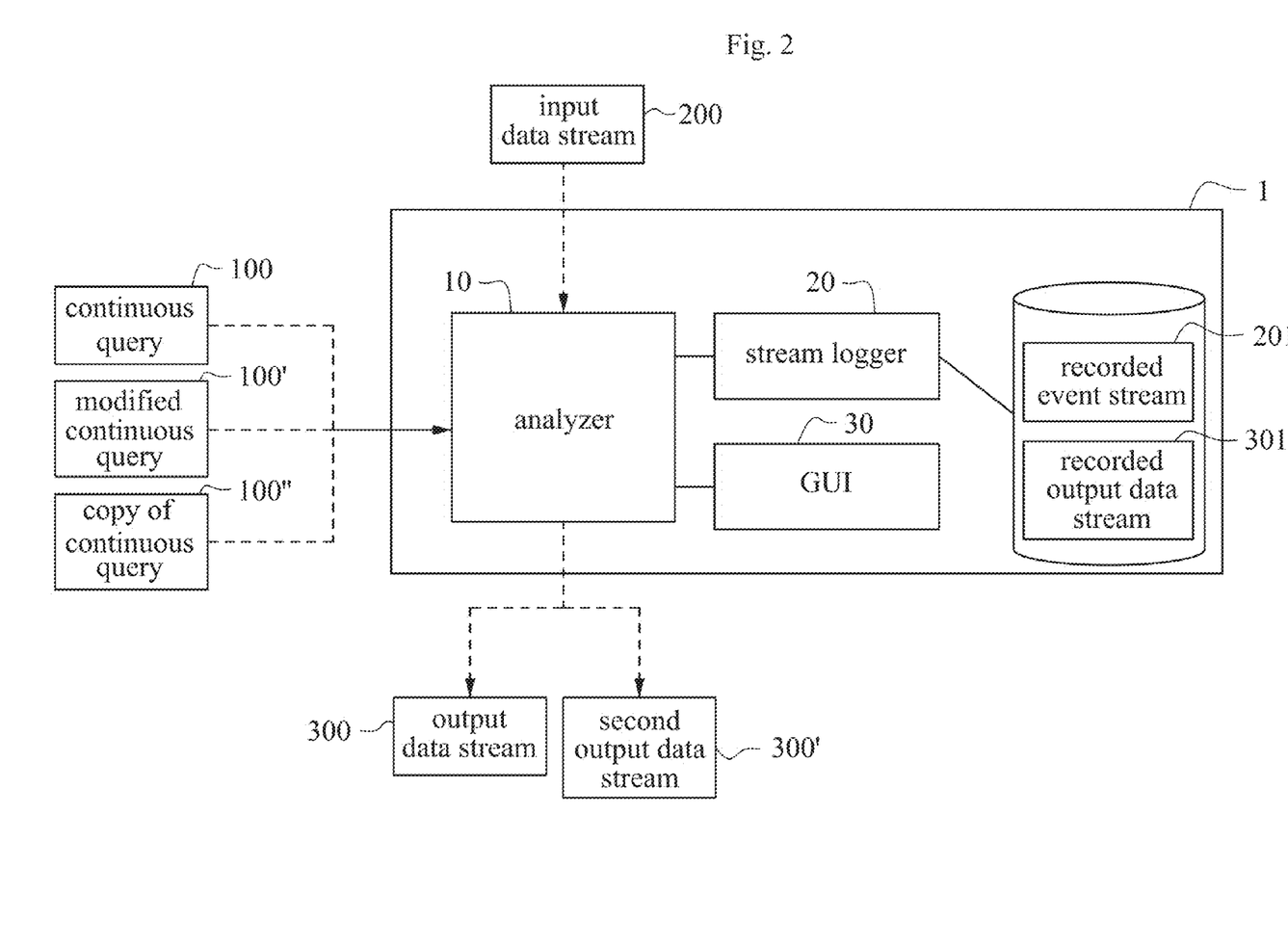
FIG. 2: A schematic block diagram of an analysis system in accordance with an embodiment of the present invention.

In the following, a presently preferred embodiment of the invention is described with respect to a debugging/analysis system 1 as schematically shown in FIG. 2. As can be seen, the analysis system 1 comprises a debugger/analyzer 10, a stream logger 20 and a graphical user interface (GUI) 30. The stream logger 20 may be configured to provide a pre-defined amount of historical data (i.e. recordings of a certain time interval of a given input data stream and/or corresponding output data stream). These recorded data streams may be used to provide answers to Question III, and in one embodiment also to Question II. It will be appreciated that further embodiments of the present invention may comprise only a sub-set of the depicted components, e.g. the analysis system 1 may only comprise the analyzer 10, wherein the further components are realized outside of the analysis system 1.

In order to evaluate query modifications (Question I), the analyzer 10 is in one embodiment capable of synchronizing the output event streams of the original and the new (modified) query and check for differences within the output streams. In order to answer the question why a certain expected event did not occur (Question II), "wind back" (see below) and "trace back" (see below) functionalities are provided, which may be incorporated in the above embodiment or realized independently therefrom. In order to assess the result stability (Question III), results of different instances of query execution may be compared.

Figure 1:
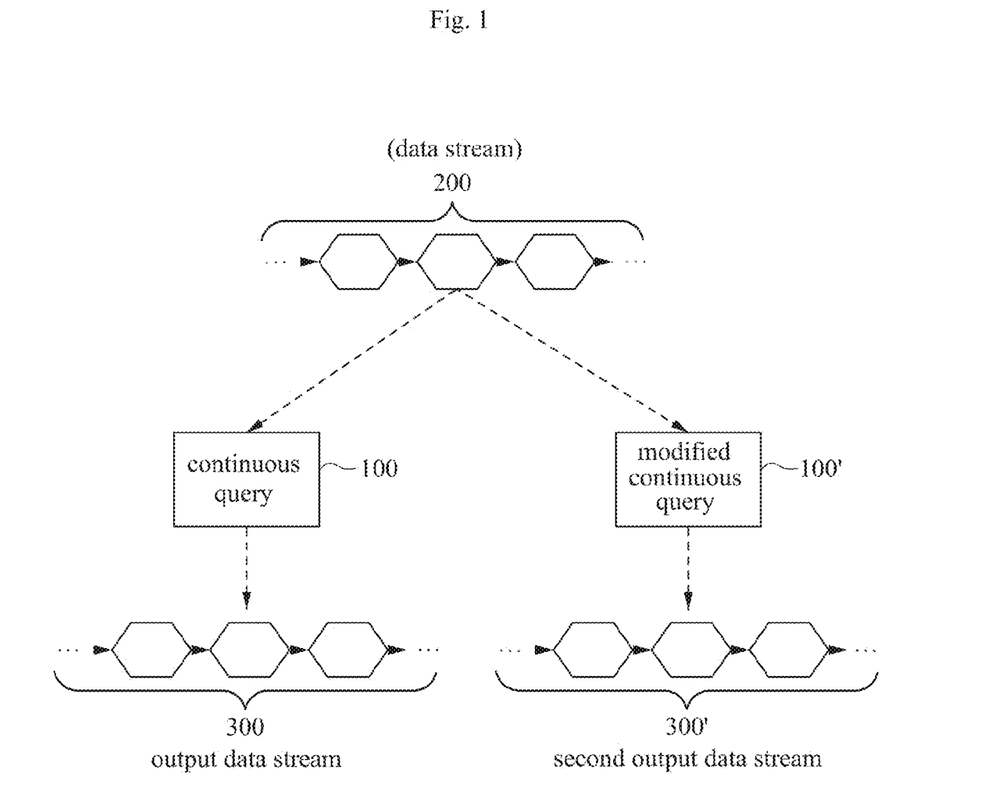
FIG. 1: A schematic view of a continuous query and a modified continuous query executing on an input data stream in accordance with an embodiment of the present invention.

In order to assess how the output data stream changes for a given query modification (Question I), the analyzer 10 may be capable of running the original continuous query 100 and a modified continuous query 100', preferably in parallel, on a given input data stream 200. In this context, FIG. 1 schematically shows two exemplary continuous queries 100 and 100', wherein the continuous query 100 is the "original" query to be analyzed/debugged and the continuous query 100' is a modified continuous query. As a simple example, the continuous query 100 and the modified continuous query 100' may differ in their respective window specifications, i.e. the query 100 may define windows of one day, while the query 100' may define windows representing the working hours (e.g. 7 am to 10 pm). It should, however, be appreciated that arbitrary complex continuous queries are supported by the present invention. As can be seen, both queries 100 and 100' take as input the input data stream 200, which comprises a sequence of events (the hexagons in FIG. 1) captured by a sensor (not depicted in FIG. 1), such as a hardware sensor (e.g. a card reader or a temperature sensor) or a software sensor (e.g. a computer program, service or other application that outputs streams of events). It will be appreciated that in all of the embodiments described herein, one or multiple input data streams 200 may be processed by the queries. Both queries 100 and 100' produce corresponding output data streams 300 and 300'.

The output streams 300 and 300' of both query executions are compared by the analyzer 10. To this end, an implicit breakpoint may be defined that fires when a difference between the two output data streams 300, 300' is encountered. Conceptually, such a difference may represent a semantically different output stream, e.g. if an attribute of an output event differs between the queries under investigation and/or if a different number of events is generated. Furthermore, there might be a difference if the sequence of output events differs (cf. further below). The main characteristic of the breakpoint is the detection of any difference in the output stream(s). In one aspect, additional conditions may be defined for the breakpoint, e.g. in order to ignore certain differences (such as event ordering, upper versus lower case and/or small delta values).

Note that the computation of such differences is not straight-forward, because the processing speed of the two queries 100, 100' might be different, and the queries have thus to be synchronized by the analyzer 10. In addition, the modified continuous query 100' might need to run some time in order to produce output events (e.g. if aggregating events over a day).

The method for synchronization depends on the query structure. Some queries (e.g. windows using tumbling windows with fixed size and arbitrary starting point) are sensitive to the position in the input stream where they start processing. For example, a query that groups input events into windows of size 5, starting with the first event it encounters, will produce different output data streams if started with event x than if started with the subsequent event x+1.

If the queries have a shape that allows to conclude that they will eventually produce comparable results regardless of the event in the input stream they start with (hereinafter Case A), the analyzer 10 may employ the following functionality: The analyzer 10 may wait for the modified continuous query 100' to produce output events in the corresponding output data stream 300', and may then (virtually) stop the input data stream(s) 200 for both the original query 100 and the modified query 100'. The last event these queries 100, 100' produced can then be used as synchronization point. For each subsequent event produced by the modified query 100' (in the output data stream 300'), a corresponding output event of the original query 100 (in the output data stream 300) may now be identified. If the identified events are not equal, the analyzer 10 may stop and display this difference. The determination whether the queries have a shape that allows to conclude that they will eventually produce comparable results may in some embodiments made algorithmically, i.e. automatically by the analysis system 1, e.g. if queries without windows are processed (i.e. queries that produce exactly one output event from one input event) and/or queries with simple sliding windows (in which the start condition of the window only depends on the start event).

In the other case, i.e. if the queries 100, 100' are sensitive to the position in the input data stream 200 where they start processing (hereinafter Case B), the analyzer 10 may employ at least a sub-set of the following functionalities:

The user may specify a "safe" synchronization point within the input data stream 200, e.g. by selecting a certain event within the stream 200 and/or by defining one or more conditions/predicates that identify suitable event(s).

By observing the original continuous query 100 while it is executing, suitable starting points within the input data stream 200 may be identified for the modified continuous query 100', e.g. by looking at the way that the original query 100 creates windows from the input stream(s) 200. This may be performed manually by a user, or preferably automatically by the analysis system 1. For example, if the queries comprise tumbling windows (i.e. they separate the input stream into non-overlapping portions), the analysis system 1 may memorize the input events together with which of these events has in fact served as a start event in such a window in the executed query. This approach is especially applicable if the modified query 100' and the original query 100 do not differ in their window definition.

The modified query 100' and a copy 100" of the original query 100 may be started in synchronization, guaranteeing an identical starting point within the input data stream 200. In other words, searching a synchronization point is effectively avoided by running both queries (original and modified query) starting at an arbitrarily selected start event (e.g. randomly selected), while the already executing original query has potentially started at another event. As this results in one additional query executing, this approach has the highest overhead. On the other hand, this approach allows to also derive some information about result stability (Question III) by comparing the results of the original query 100 and its copy 100". For example, if the following input stream "10, 20, 15, 10, 11, 12, 10, 11, 18, 13, . . . " of temperature events is processed by a continuous query to generate non-overlapping windows of size 3 and to compute the their average values, this results in different output streams depending on the start event. If the start event is the first event "10" in the stream, the output stream is "15, 11, 13, . . . ". If the start event is the event "20", the output stream is "15, 11, 14, . . . ". This example shows that differences in the output stream may not be directly visible, but in certain scenarios may be identified only later (in the above example not before the third output event is generated).

In some embodiments, the recorded event streams 201 recorded by the stream logger 20 (cf. FIG. 2) may be used as initial feed to the modified query 100', which is seamlessly continued by the "live" input data stream 200 (while it is captured by the sensor). As a result, earlier result generation is possible, and the synchronization point can be set to the current time, which is the time when the recorded event streams 201 end in case A, i.e. if the queries have a shape that allows to conclude that queries will eventually produce comparable results regardless of the event in the input stream they start with. Alternatively, a synchronization point in the past can be selected (similar as described above) in case B, i.e. if the queries 100, 100' are sensitive to the position in the input data stream 200 where they start processing.

In a further embodiment, the location where differences occur within the output data streams 300 and 300' may be graphically displayed in a graphical representation of both queries' operator graphs 400 (cf. FIG. 3) displayed by the GUI 30 of the analysis system 1. In this case, the query operator graph 400 will show differences for each corresponding operator node, in case the operator graphs are similar enough. Two given graphs may be considered similar, e.g. if they comprise the same operators in the same relationships and only differ in one or more parameters, such as the window size, and/or if one of the operator graphs comprises an additional operator, while the remaining graph equals the other graph.

Sometimes, the output event stream(s) 300, 300' may be only partially ordered, or order does not matter (in which case two output streams 300 and 300' may be considered equal, even if the sequence of events is slightly different). This may be the case if a certain option "ignore order" is selected in the analysis system 1, and/or if this information can be derived from a description/definition of the event stream. For example, for each working day and each employee registered at a card reader, one event may be to be generated (see also the example further below). In this example, there is typically an order on the dates of the working days, but not necessarily an order on the employees. In this case, not only individual events have to be compared in the respective output data streams 300 and 300', but sets of events that comprise a plurality of individual events. The analysis system 1 may provide the ability to define such sets, e.g. to group corresponding events into event sets by means of the GUI 30. With respect to the above Question III, in order to assess why a certain expected event has not occurred in an output data stream 300 produced by a given continuous query 100, the history of the corresponding input data stream 200 has to be assessed, i.e. why did the processing of a given input data stream 200 not result in a specific event. In this context, the analyzer 10 may provide the functionality to go back in history to the time under consideration. For this purpose, the analyzer 10 may provide a "wind back" functionality that allows to position the output data stream 300 to the time under consideration, wherein the analyzer 10 then provides access to the corresponding input data stream 200 and/or any intermediate data streams at that time (i.e. a synchronized wind back on these streams is provided). It will be appreciated that this aspect of the present invention may be realized independently from the above-explained synchronization capabilities of two queries 100 and 100'. In this embodiment, the stream logger 20 is preferably adapted for recording the at least one output data stream 300 produced by the at least one continuous query 100 into at least one recorded output data stream 301.

In order to wind back to time t, the continuous query 100 has to be analyzed to a certain extent. The windows defined within the continuous query 100 on the input data stream 200 give a boundary on how far in the past the recorded output data streams 301 have to be considered. The earliest such point in time is referred to as T hereinafter. The query 100 is then re-run on the recorded input data streams 201 starting at T and all intermediate processing states within the query operators of the query 100 are memorized/recorded, until the first output event beyond time t is generated. Thereby, all intermediate results (the results of the one or more query operators of the query 100) are recorded for further analysis.

Subsequently, each query operator may be inspected (e.g. manually by the user) as to why it did not provide the output (i.e. an intermediate output data stream) needed to generate the expected event in the end.

As an example, if the window is based on a fixed size of e.g. 5, it is clear that you have to go back at least 5 events for T. If the window definition is based on time (e.g. one hour), you have to go back until you see events that are more than one hour before the output event in question. If the window definition is based on a condition, you have to go back to the most recent event that matches this condition, etc. Note that synchronization as described above must typically be applied in addition. In the above example, you have to go back to the first event of the respective working day.

Figure 3:
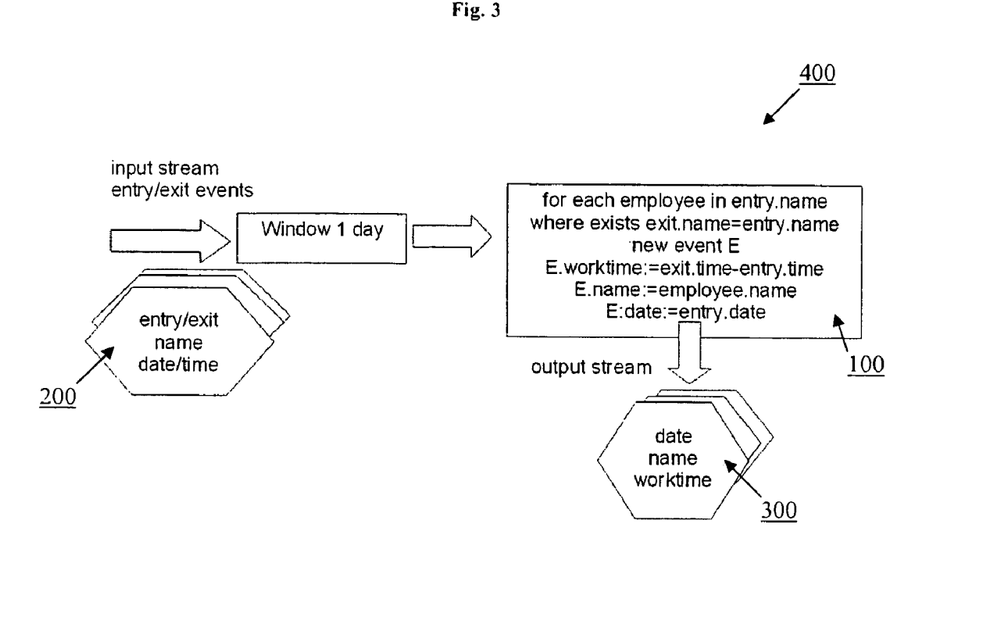
FIG. 3-5: Exemplary operator graphs of a continuous query in accordance with an embodiment of the present invention.
Figure 4:
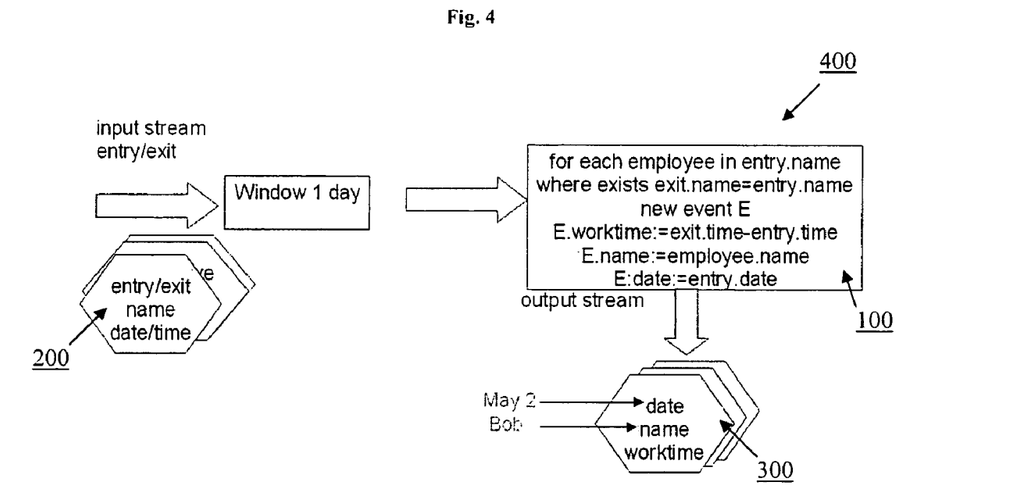
Figure 5:
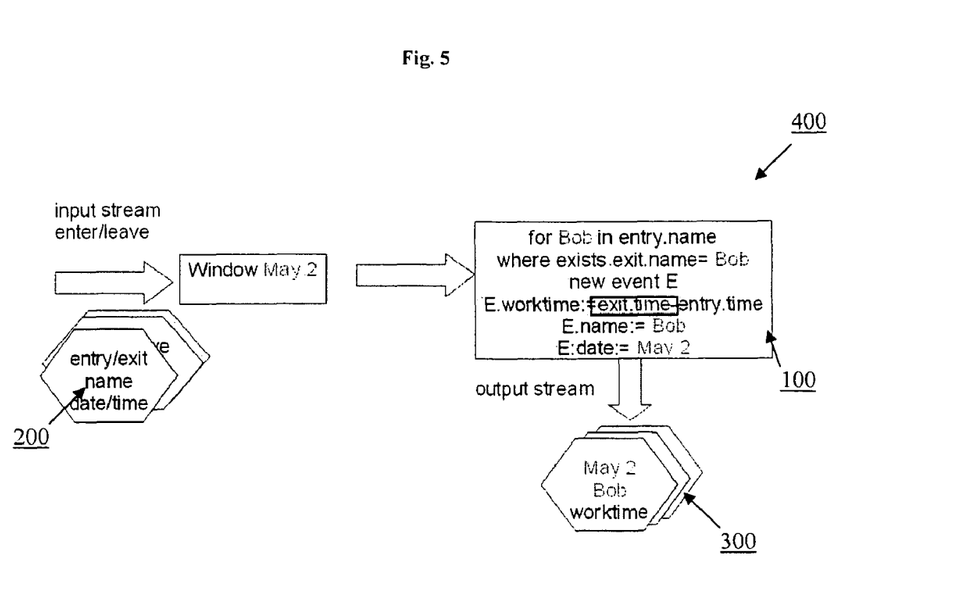

Furthermore, the analysis system 1 may be adapted for letting the user specify the expected event by defining one or more expected values of one or more attributes of the respective event. In this case, data flow analysis may be employed by the analyzer 10 in order to automatically highlight those query operators within the operator graph 400 displayed in the GUI 30 that would have delivered the relevant attribute value ("trace back"). This aspect will be explained in the following in connection with FIGS. 3-5. FIG. 4 shows that two output values have been selected for the operator graph depicted in FIG. 3, namely "date" (with value "May 2") and "name" (with value "Bob"). FIG. 5 shows that the origin of "date" and "name" is traced back in the operator graph and that the respective values are inserted where appropriate. Here, it is shown that "date" eventually originates from the window definition (since the window is defined over date equality), while there is supposed to exist an entry for "name" with value "Bob" (cf. "for Bob in entry.name" in FIG. 5) and an "exit" event (cf. "where exists exit.name=Bob" in FIG. 5). The trace back functionality now re-builds the window for date "May 2", verifies that there was a suitable "entry" event, but does not find a corresponding "exit" event. As a result, "exit" can be highlighted in the $2^{nd}$ operator of the query 100 (cf. FIG. 5).

In the following, a further simple example will be described in the context of the continuous query 100 comprising two operators ("for" and "window") schematically depicted in FIG. 3. The continuous query 100 is executed on an input data stream 200 that comprises a sequence of events, wherein each event comprises an attribute "entry/exit", an attribute "name" and an attribute "date/time" (cf. FIG. 3). Accordingly, the input data stream 200 captures employees entering and leaving a building and records the employees' names and time of entering/leaving, wherein the input data stream 200 comprises one event per entering ("entry") or leaving employee ("exit"). The continuous query 100 in the example of FIG. 3 produces an output data stream 300 comprising one event for each working day and for each employee, wherein each produced event comprises the event attributes "date", "name" and "worktime". The attribute "worktime" is an example of a complex output event calculated from multiple input events, in this case the value of "worktime" is calculated by subtracting the entry time of a given employee from the exit time of this employee.

In this example, it will be investigated why a certain expected output event did not occur within the output data stream 300 (Question II), more particularly, why the output data stream 300 does not comprise a working time event for the employee Bob on May, 2. In order to assess this question, the user may specify the corresponding attribute values within the expected output event, as schematically shown in FIG. 4. Here, the user has set the "date" attribute to "May 2" and the "name" attribute to "Bob".

After the analyzer 10 has performed the above-described "wind back" and "trace back" functionalities, the highlighted operator graph 400 for the given continuous query 100 shown in FIG. 5 graphically indicates that on May 2, there is no "exit" event record for "Bob" within the corresponding input data stream 200.

In a further embodiment of the present invention, output events within a given output data stream 300 that are similar to the "missing" expected event (in the above example: output event for Bob on May 2) may be displayed by the analyzer 10 in order to allow the user to drill down on these output events and to analyze why and how these output events were generated. Event similarity may be derived implicitly by the analysis system 1 using predefined distance metrics, or may be specified by the user. In a further embodiment, breakpoints may be set when an event occurs that is similar to a specified event.

It will be appreciated that the analysis system 1 may include any suitable combination of programmed logic circuitry (e.g., hardware, software, firmware, and/or the like). For example, the analysis system 1 may include a processor that helps execute instructions generated by the analyzer 10 and/or stream logger 20. In certain example embodiments, the GUI 30 may be displayable on a display (not shown in FIG. 2). In certain example embodiments, the recorded input data stream 201 and the recorded output data stream 301 may be stored in a suitable storage location (such as, for example, one or more databases, files, or other tangible memory locations). Similarly, the various queries and streams contemplated herein may be received from and/or at least temporarily stored on a suitable storage location, and similarly may be operated upon by a processor provided to the analysis system 1. It will be appreciated that in certain example embodiments, the analyzer 10 may comprise instructions tangibly stored on a computer readable storage medium that, when executed by a processor (e.g., of the analysis system 1), perform the above-described method steps. It also will be appreciated that the example methods disclosed herein may be executed, in whole or in part, by the analysis system 1 and/or a processor thereof.

The invention claimed is:

1. An analysis system for analyzing at least one continuous query for at least one input data stream, wherein the at least one input data stream comprises a sequence of events captured by at least one sensor, and wherein the analysis system comprises:

an analyzer configured to execute the at least one continuous query and at least one modified continuous query on the at least one input data stream, compare at least one output data stream produced by the at least one continuous query with at least one second output data stream produced by the at least one modified continuous query, and indicate at least one difference between the at least one output data stream and the at least one second output data stream;

wherein the analyzer is further configured to synchronize the execution of the at least one continuous query and the at least one modified continuous query; and wherein the system further comprises a stream logger configured to record the at least one output data stream into at least one recorded output data stream, wherein the analyzer is configured to select at least one event in the at least one recorded output data stream and to provide access to the corresponding at least one event in at least one recorded input data stream.

2. The analysis system of claim 1, wherein the analyzer is configured to let a user select at least one synchronization point within the at least one input data stream.

3. The analysis system of claim 1, wherein the analyzer is configured to analyze the at least one continuous query to determine at least one synchronization point within the at least one input data stream.

4. The analysis system of claim 1, wherein the analyzer is configured to execute the at least one modified continuous query and a copy of the at least one continuous query starting at the same event in the at least one input data stream.

5. The analysis system of claim 1, further comprising a graphical user interface (GUI) configured to display at least one operator graph of the at least one continuous query and at least one operator graph of the at least one modified continuous query, wherein the GUI is configured to highlight the at least one difference in the at least one operator graphs.

6. The analysis system of claim 1, wherein the analyzer is configured to re-execute the at least one continuous query on the at least one recorded input data stream starting at the selected at least one event and to log any intermediate results produced by the at least one continuous query.

7. An analysis system for analyzing at least one continuous query for at least one input data stream, wherein the at least one input data stream comprises a sequence of events captured by at least one sensor, and wherein the analysis system comprises;

an analyzer configured to execute the at least one continuous query and at least one modified continuous query on the at least one input data stream, compared at least one output data stream produced by the at least one continuous query with at least one second output data stream produced by the at least one modified continuous query, and indicate at least one difference between the at least one output data stream and the at least one second output data stream;

wherein the analyzer is further configured to synchronize the execution of the at least one continuous query and the at least one modified continuous query; and wherein the analyzer is further configured to wait for the at least one modified continuous query to produce at least one event in the corresponding at least one second output data stream and to compare the at least one produced event with at least one corresponding event in the at least one output data stream produced by the at least one continuous query.

8. An analysis system for analyzing at least one continuous query for at least one input data stream, wherein the at least one input data stream comprises a sequence of events captured by at least one sensor, and wherein the analysis system comprises:

an analyzer configured to execute the at least one continuous query and at least one modified continuous query on the at least one input data stream, compare at least one output data stream produced by the at least one continuous query with at least one second output data stream produced by the at least one modified continuous query, and indicate at least one difference between the at least one output data stream and the at least one second output data stream;

wherein the analyzer is further configured to synchronize the execution of the at least one continuous query and the at least one modified continuous query; and wherein the system further comprises a stream logger configured to record the at least one input data stream into at least one recorded input data stream, wherein the analyzer configured to execute the at least one modified continuous query on the at least one recorded input data stream followed by the at least one input data stream while it is captured by the at least one sensor.

9. A method for analyzing at least one continuous query for at least one input data stream, wherein the at least one input data stream comprises a sequence of events captured by at least one sensor, the method comprising:

executing, in connection with a processor of a computer, the at least one continuous query and at least one modified continuous query on the at least one input data stream, comparing at least one output data stream produced by the at least one continuous query with at least one second output data stream produced by the at least one modified continuous query and indicating at least one difference between the at least one output data stream and the at least one second output data stream;

synchronizing the execution of the at least one continuous query and the at least one modified continuous query;

recording, to a non-transitory computer storage medium, the at least one output data stream into at least one recorded output data stream;

enabling a user to select at least one event in the at least one recorded output data stream; and providing access to the corresponding at least one event in at least one recorded input data stream.

10. The method of claim 9, wherein said synchronizing comprises analyzing the at least one continuous query to determine at least one synchronization point within the at least one input data stream.

11. The method of claim 9, further comprising executing the at least one modified continuous query and a copy of the at least one continuous query starting at the same event in the at least one input data stream.

12. A computer system including at least one processor and a computer program comprising a set of instructions that, when executed by the at least one processor, implement a method according to claim 9.

13. A method for analyzing at least one continuous query for at least one input data stream, wherein the at least one input data stream comprises a sequence of events captured by at least one sensor, the method comprising:

executing, in connection with a processor of a computer, the at least one continuous query and at least one modified continuous query on the at least one input data stream, comparing at least one output data stream produced by the at least one continuous query with at least one second output data stream produced by the at least one modified continuous query and indicating at least one difference between the at least one output data stream and the at least one second output data stream; and synchronizing the execution of the at least one continuous query and the at least one modified continuous query, said synchronizing comprising waiting for the at least one modified continuous query to produce at least one event in the corresponding at least one second output data stream;

wherein said comparing includes comparing the at least one produced event with at least one corresponding event in the at least one output data stream produced by the at least one continuous query.

* * * * *

UNITED STATES PATENT AND TRADEMARK OFFICE
CERTIFICATE OF CORRECTION

| | | |
|---|---|---|
| PATENT NO. | : 8,346,511 B2 | Page 1 of 1 |
| APPLICATION NO. | : 12/656465 | |
| DATED | : January 1, 2013 | |
| INVENTOR(S) | : Schöning et al. | |

It is certified that error appears in the above-identified patent and that said Letters Patent is hereby corrected as shown below:

On the title page, Item [12]:

Please delete "Schoning" and insert --Schöning--

On the title page, Item [75]:

Please delete "Schoning" and insert --Schöning--

Signed and Sealed this
Eighteenth Day of March, 2014

Michelle K. Lee
*Deputy Director of the United States Patent and Trademark Office*